(12) United States Patent  (10) Patent No.: US 7,821,793 B2
Yin  (45) Date of Patent: Oct. 26, 2010

(54) MOUNTING DEVICE FOR ELECTRONIC COMPONENT

(75) Inventor: Xiu-Zhong Yin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 617 days.

(21) Appl. No.: 11/858,131

(22) Filed: Sep. 20, 2007

(65) Prior Publication Data

US 2009/0057506 A1    Mar. 5, 2009

(30) Foreign Application Priority Data

Aug. 29, 2007    (CN) .................... 2007 2 0200899 U

(51) Int. Cl.
*H05K 7/12* (2006.01)

(52) U.S. Cl. .................... 361/747; 361/740; 361/732; 361/726

(58) Field of Classification Search ................. 361/726, 361/732, 740, 747, 807, 808; 174/520
See application file for complete search history.

(56) References Cited

U.S. PATENT DOCUMENTS

| 6,771,516 | B1 * | 8/2004 | Leman et al. | 361/825 |
| 6,982,878 | B2 * | 1/2006 | Chen et al. | 361/801 |
| 7,106,601 | B2 * | 9/2006 | Chen et al. | 361/801 |
| 7,110,264 | B2 * | 9/2006 | Chen et al. | 361/801 |
| 7,339,549 | B2 * | 3/2008 | Maxwell | 343/892 |
| 7,561,441 | B1 * | 7/2009 | Chang | 361/801 |
| 7,639,506 | B2 * | 12/2009 | Chen et al. | 361/747 |

* cited by examiner

*Primary Examiner*—Dameon E Levi
(74) *Attorney, Agent, or Firm*—Frank R. Niranjan

(57) ABSTRACT

A mounting device for an electronic component includes a plate, a securing piece, and an electronic component. The plate forms a first fixing hole and an L-shaped hook. The securing piece includes a first end, an opposite second end, and at least one hole. An insert portion extends outwards from the second end, insertable into the first fixing hole of the plate. A resilient arm extends outwards from the first end and forms a second fixing hole. The hook is inserted into the second fixing hole by resilient force of the resilient arm. The electronic component forms at least one positioning block insertable into the at least one hole of the securing piece.

20 Claims, 5 Drawing Sheets

MOUNTING DEVICE FOR ELECTRONIC COMPONENT

BACKGROUND

1. Field of the Invention

The present invention relates to a mounting device, and more particularly to a mounting device for an electronic component.

2. Description of Background

Various types of 3C (computer, communication, consumer electronics) products are used today. Generally, each type of 3C product has one or more special batteries. For example, a chip for controlling plug-and-play hard disk in a server is driven by a battery. The battery is secured in the server by a number of screws. It is cumbersome and time-consuming. Extra components such as screws increase costs. Furthermore, during assembly, extra space for attaching the screws is required.

What is desired, therefore, is a mounting device for a battery which is adapted to conveniently mount a battery.

SUMMARY

A mounting device for an electronic component includes a plate, a securing piece, and an electronic component. The plate forms a first fixing hole and an L-shaped hook. The securing piece includes a first end, an opposite second end, and at least one hole. An insert portion extends outwards from the second end, insertable into the first fixing hole of the plate. A resilient arm extends outwards from the first end and forms a second fixing hole. The hook is inserted into the second fixing hole by resilient force of the resilient arm. The electronic component forms at least one positioning block insertable into the at least one hole of the securing piece.

Advantages and novel features of the present invention will be drawn from the following detailed description of preferred embodiment with attached drawings, in which:

DETAIL DESCRIPTION OF PREFERRED EMBODIMENT

Figure 1:
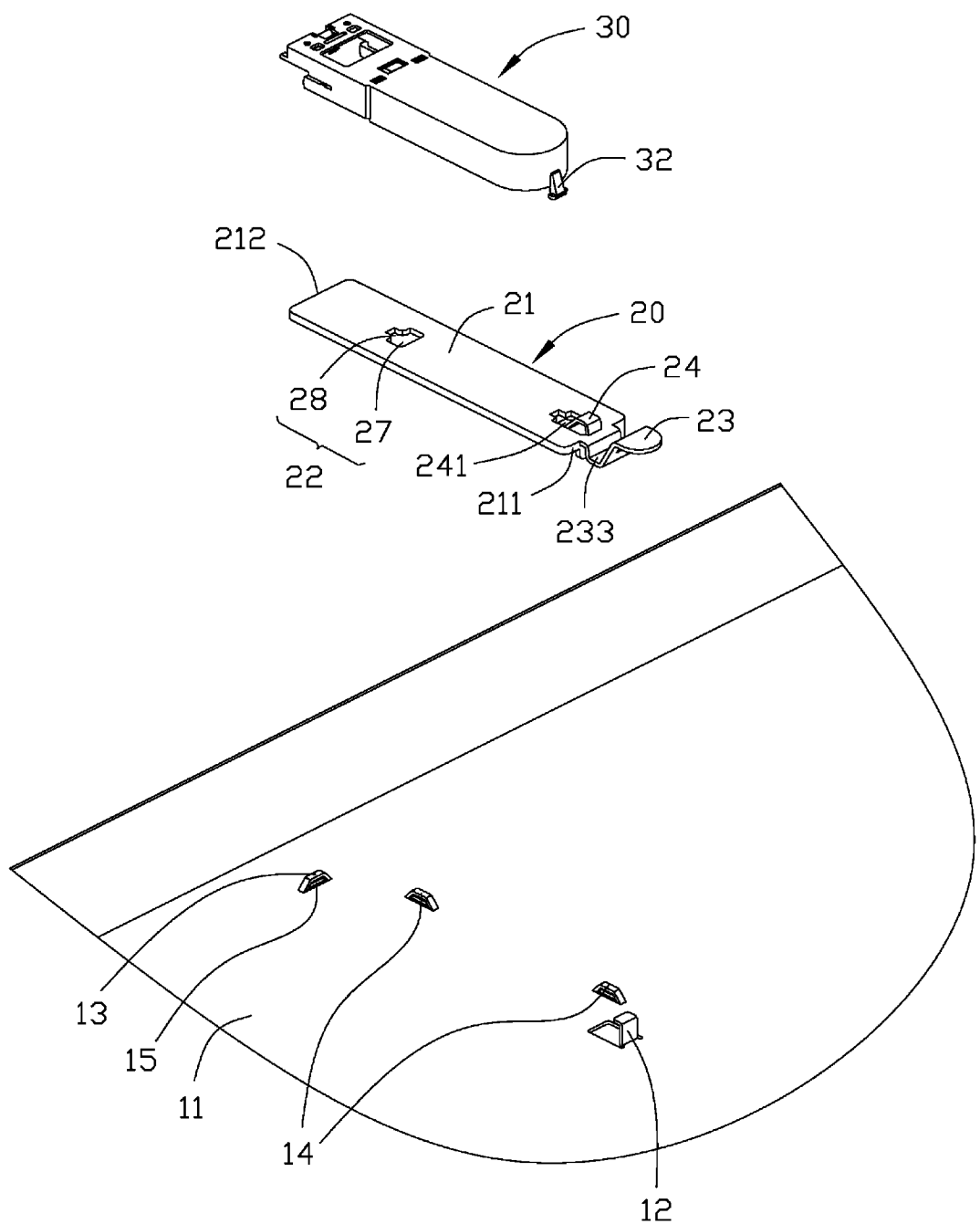
FIG. 1 is an exploded, isometric view of a mounting device for battery of an embodiment of the present invention.

Referring to FIG. 1, a mounting device for a battery in accordance with an embodiment of the present invention includes a securing piece 20, for securing a battery 30 on a plate 11 in a server.

The plate 11 forms an L-shaped hook 12, a protruding bridge 13, and two bridges 14. A first fixing hole 15 is defined under the protruding bridge 13. The hook 12 and the protruding bridge 13 are on a line, and the two bridges 14 are beside them.

Figure 2:
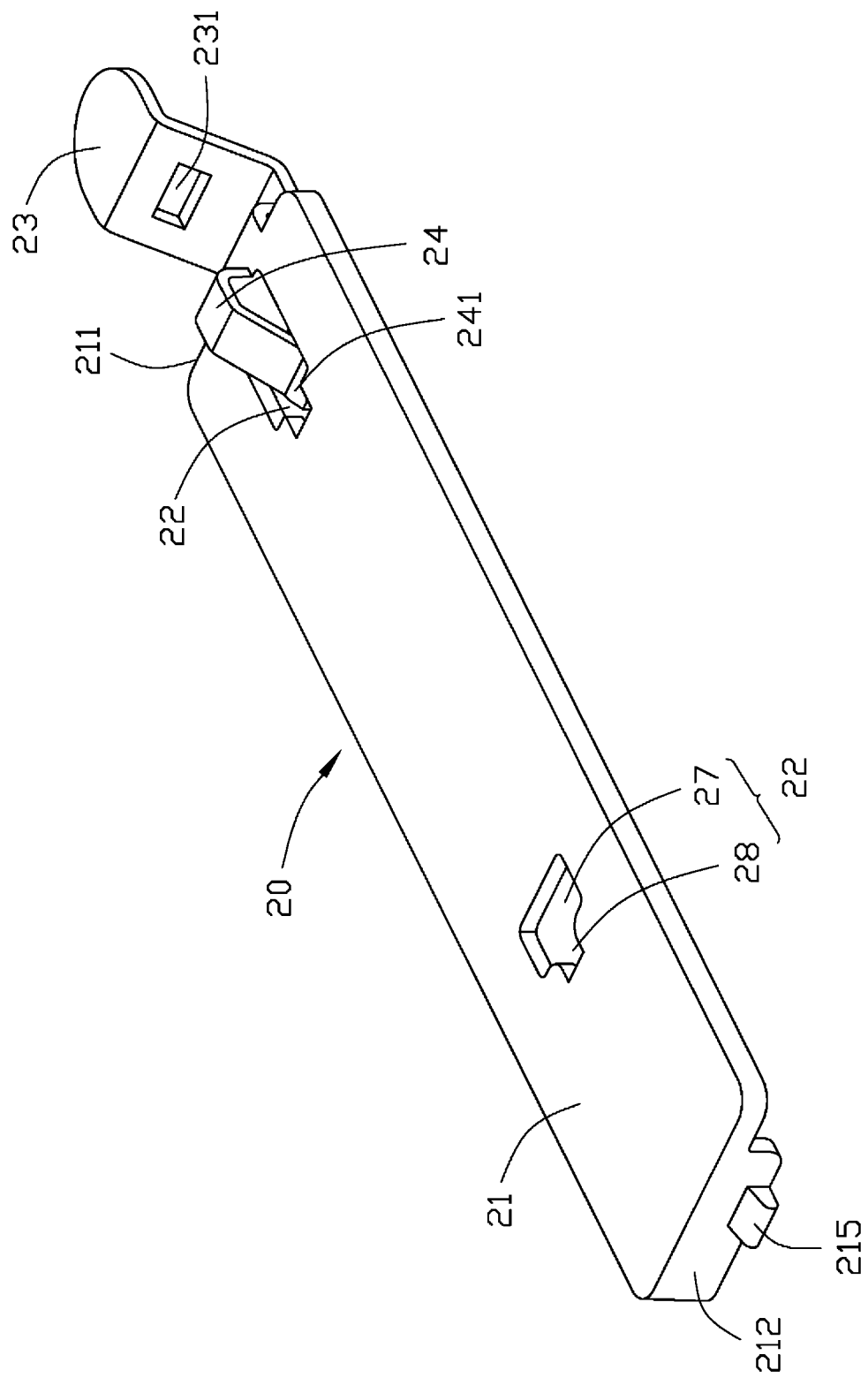
FIG. 2 is an isometric view of a securing piece of FIG. 1.

Referring to FIGS. 1 and 2, the securing piece 20 includes a rectangular body 21. The body 21 includes a first end 211 and a second end 212. A slanted resilient arm 23 extends outwards from the first end 211 of the body 21. The resilient arm 23 has a lower support portion 233 brought into contact with the plate 11. A second fixing hole 231 is defined in the resilient arm 23. An insert portion 215 extends outwards from the second end 212 of the body 21. A distance between the insert portion 215 and the second fixing hole 231 is equal to a distance between the hook 12 of the plate 11 and the first fixing hole 15. Two holes 22 are defined in the middle portion of the base body 21 and adjacent to the first end 211 respectively. Each hole 22 includes a larger entry portion 27 and a smaller restricting portion 28. A resilient portion 24 extends from an edge of the hole 22 adjacent to the first end 211. The resilient portion 24 is arched upwards at a middle portion thereof, and forms a free end 241. The free end 241 extends into the restricting portion 28 from the entry portion 27 of the hole 22.

Figure 3:
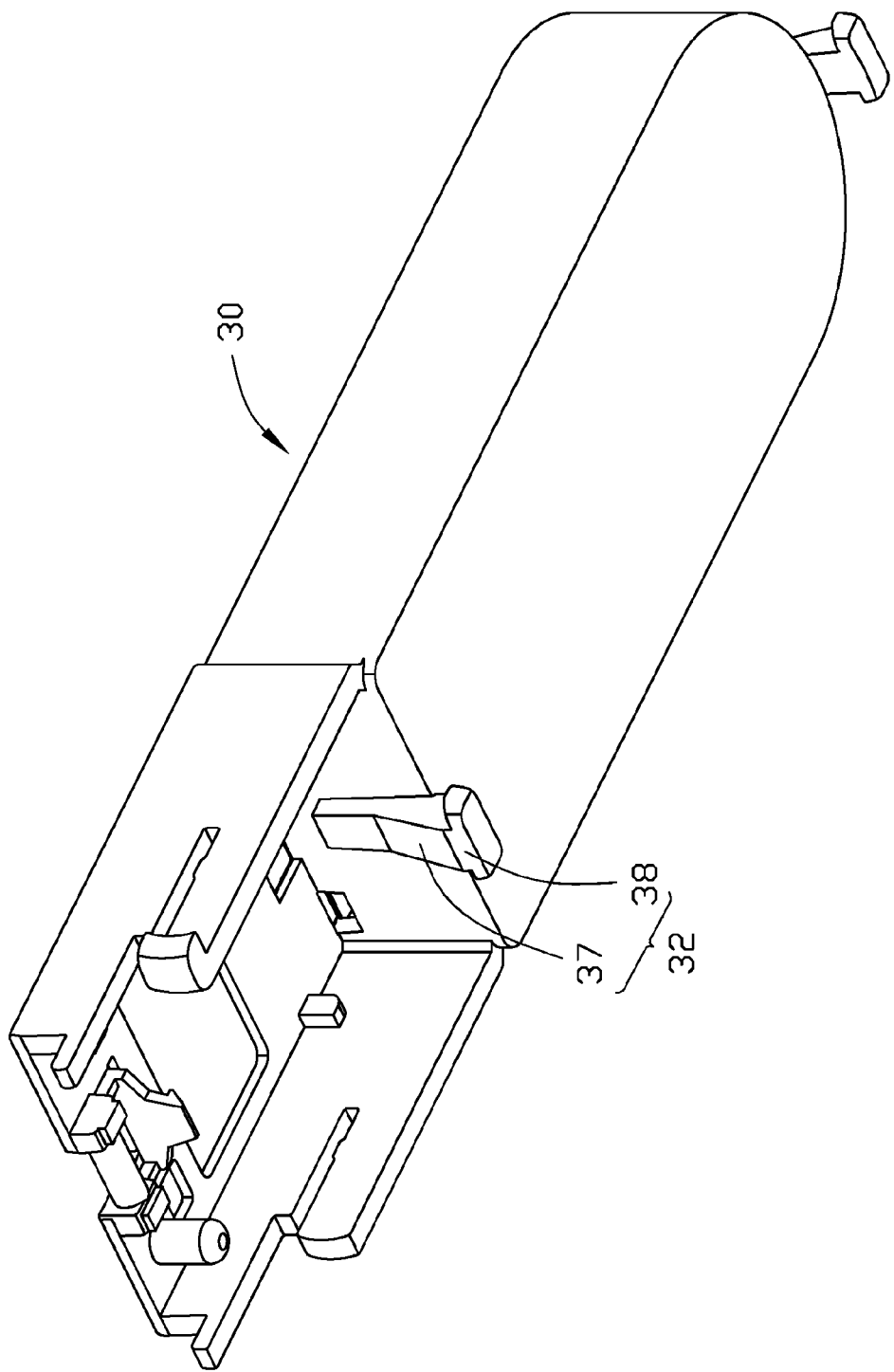
FIG. 3 is an isometric view of a battery of FIG. 1.

Referring to FIGS. 1 and 3, two positioning blocks 32 are formed on the battery 30 corresponding to the two holes 22 of the securing piece 20. Each positioning block 32 includes a connection portion 37 and an engaging portion 38 connecting with the connection portion 37. The sizes of the connection portion 37 and the engaging portion 38 are both smaller than the size of the entry portion 27 of the hole 22, and are insertable into the entry portion 27. The size of the connection portion 37 is smaller than that of the restricting portion 28. The size of the engaging portion 38 is greater than that of the restricting portion 28.

Figure 4:
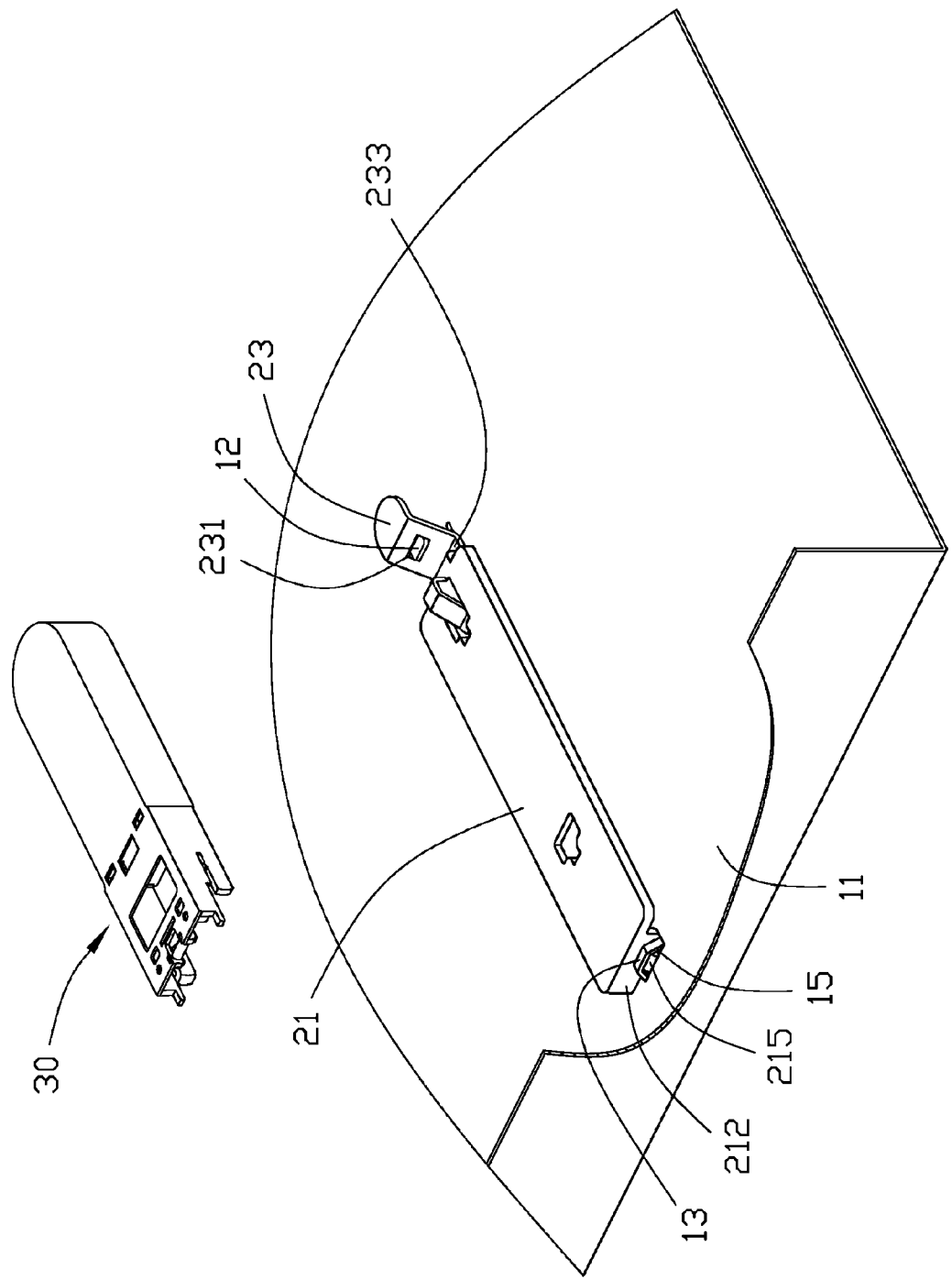
FIG. 4 is a partially-assembled isometric view of FIG. 1.
Figure 5:
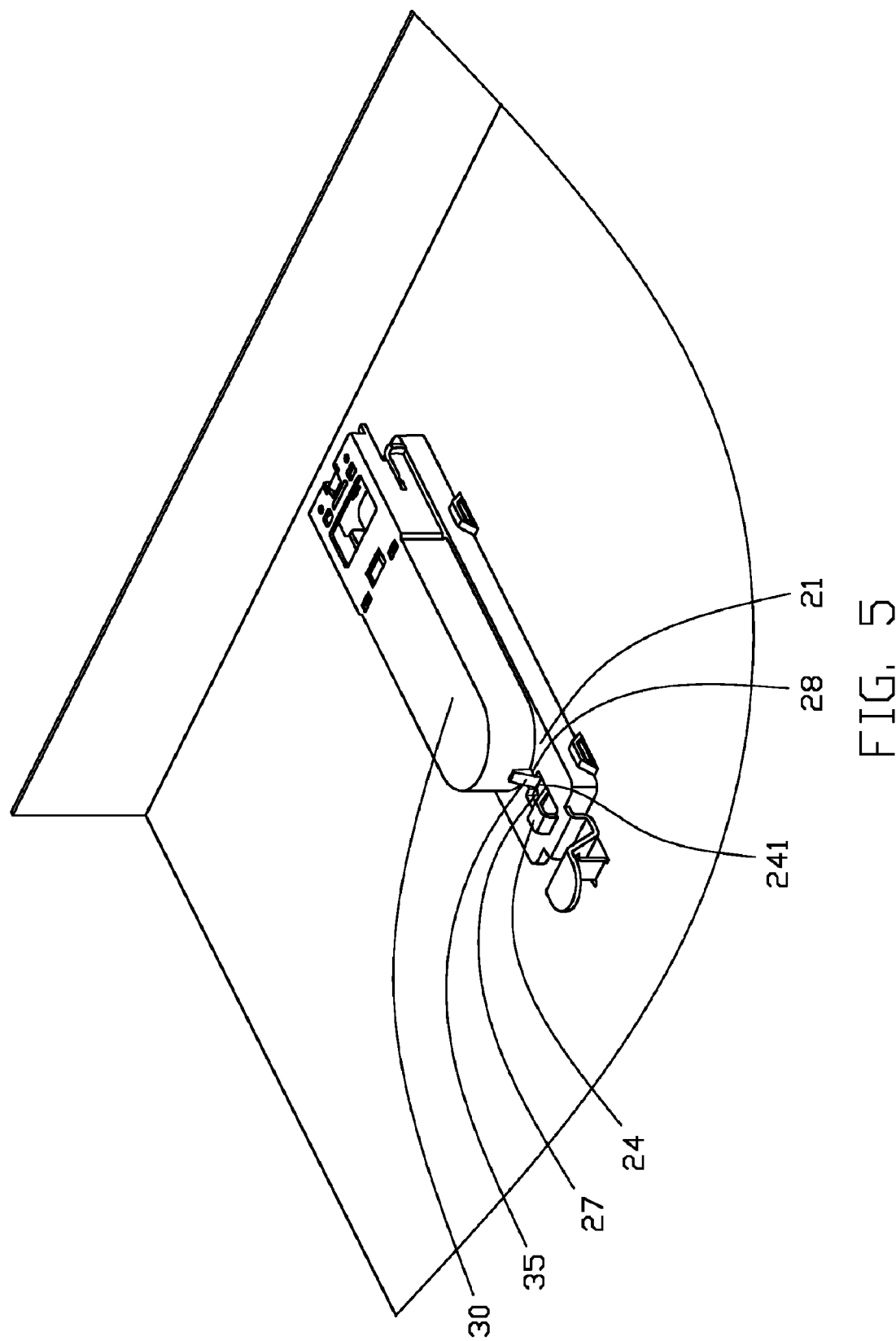
FIG. 5 is an assembled view of FIG. 1.

Referring to FIGS. 1, 4, and 5, in assembly, the insert portion 215 of the securing piece 20 is inserted into the first fixing hole 15. The resilient arm 23 of the securing piece 20 is forced to be resiliently deformed towards the protruding bridge 13 until the hook 12 of the plate 11 is aligned with the second fixing hole 231 of the resilient arm 23. Then, the resilient arm 23 is released and the hook 12 inserts into the second fixing hole 231. One side of the body 21 resists against the two bridges 14. The support portion 233 is placed on the plate 11 in order to support the body 21. Then the positioning blocks 32 of the battery 30 are inserted into the entry portions 27 of the holes 22 respectively with the engaging portion 38 located below the underside of the body 21. The engaging portion 38, of the positioning block 32 in front of the battery 30, presses down the free end 241 of the resilient portion 24 to resiliently deform the resilient portion 24. The battery 30 is moved on the body 21 so that the connection portion 37 of each positioning block 32 of the battery 30 moves from the entry portion 27 of each hole 22 to the restricting portion 28. The engaging portion 38 of each positioning block 32 is located under the restricting portion 28 and resists against the underside of the body 21. The battery 30 is thus secured vertically. The resilient portion 24 rebounds and the free end 241 resists against the positioning block 32 to stop the battery 30 moving back. Thereby the battery 30 is secured on the securing piece 20.

In disassembly, the resilient portion 24 is pressed down, so the free end 241 does not resist against the positioning block 32 of the battery 30. The battery 30 is moved on the body 21, so that ach positioning block 32 of the battery 30 is moved from the restricting portion 28 of each hole 22 to the entry portion 27. Thereby the battery 30 can be removed from the securing piece 20.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly comprising:
   a plate having a first fixing hole, a hook, and at least one bridge;
   a securing piece mounted on the plate, the securing piece comprising a first end and an opposite second end, an insert portion extending outwards from the second end, the insert portion inserted into the first fixing hole of the plate, a resilient arm extending slantedly outwards from the first end, a second fixing hole defined in the resilient arm, the hook engaged in the second fixing hole, the at least one bridge resisting against a lateral side of the securing piece, the lateral side connecting the first end with the second end; and
   an electronic component mounted on the securing piece.

2. The mounting assembly as described in claim 1, wherein at least one hole is defined in the securing piece, at least one positioning block is formed under the electronic component and is inserted into the corresponding hole.

3. The mounting assembly as described in claim 2, wherein an engaging portion is formed on each positioning block, each hole of the securing piece includes an entry portion and a restricting portion, the engaging portion passing through the entry portion and being engaged in the restricting portion.

4. The mounting assembly as described in claim 3, wherein the size of the entry portion is larger than that of the engaging portion, and the size of the restricting portion is smaller than that of the engaging portion.

5. The mounting assembly as described in claim 3, wherein each positioning block includes a connection portion connecting with the electronic component, the engaging portion is formed on an end of the connection portion, the connection portion engagingly received in the restricting portion.

6. The mounting assembly as described in claim 3, wherein the securing piece includes an arch-shaped resilient portion, a free end of the resilient portion extending into the restricting portion to resist against the engaging portion of the positioning block.

7. The mounting assembly as described in claim 1, wherein a bridge protrudes from the plate, the first fixing hole is defined between the bridge and the plate.

8. The mounting assembly as described in claim 1, wherein the resilient arm has a lower support portion brought into contact with the plate.

9. A mounting assembly comprising:
   a plate having a first fixing hole, an upright hook extending from the plate;
   a securing piece mounted on the plate, the securing piece comprising a first end and an opposite second end, an insert portion extending outwards from the second end, the insert portion inserted into the first fixing hole of the plate, a resilient arm extending slantedly outwards from the first end, a second fixing hole defined in the resilient arm, the hook engaged in the second fixing hole; and
   an electronic component mounted on the securing piece.

10. The mounting assembly as described in claim 9, wherein at least one hole is defined in the securing piece, at least one positioning block is formed under the electronic component and is inserted in the corresponding hole.

11. The mounting assembly as described in claim 10, wherein an engaging portion is formed on each positioning block, each hole of the securing piece includes an entry portion and a restricting portion, the engaging portion passing through the entry portion and being engaged in the restricting portion.

12. The mounting assembly as described in claim 11, wherein each positioning block includes a connection portion connecting with the electronic component, the engaging portion is formed on an end of the connection portion, the connection portion received in the restricting portion.

13. The mounting assembly as described in claim 11, wherein the securing piece includes an arch-shaped resilient portion, a free end of the resilient portion extending into the restricting portion to resist against the engaging portion of the positioning block.

14. The mounting assembly as described in claim 9, wherein a distance between the insert portion of the securing piece and the second fixing hole is equal to a distance between the hook of the plate and the first fixing hole.

15. The mounting assembly as described in claim 9, wherein a bridge protrudes from the plate, the first fixing hole is defined between the bridge and the plate.

16. The mounting assembly as described in claim 9, wherein at least one bridge is formed on the plate, for resisting against one side of the securing piece.

17. The mounting assembly as described in claim 9, wherein the resilient arm has a lower support portion brought into contact with the plate.

18. A mounting device for an electronic component, the electronic component having a first and a second protrusion, each of the first and second protrusions having a neck portion and a head portion having a larger size than that of the neck portion, the mounting device comprising:
   a mounting plate, a hook extending from the mounting plate; and
   a securing piece mounted on the plate, the securing piece comprising a plate portion suspended over the mounting plate with a clearance formed between the plate portion and the mounting plate for receiving the head portions of the first and second protrusions therein, the plate portion having a first engaging hole, a second engaging hole, and a resilient tab, each of the first and second engaging holes being structured and sized in a manner such that neck portions of the first and second protrusions are engageably received therein and movable in a given direction, the resilient tab being configured for applying a force on the second protrusion in the given direction, a resilient arm extending diagonally outwards from the plate portion, a second fixing hole defined in the resilient arm, and the hook is engaged in the second fixing hole.

19. The mounting device as described in claim 18, wherein the plate portion includes an arch-shaped resilient portion, a free end of the resilient portion extending into the second engaging hole to resist against the head portion of the second protrusion.

20. The mounting device as described in claim 18, wherein the mounting plate includes a first fixing hole, an insert portion extending outwards from a free end of the plate portion to insert in the first fixing hole.

* * * * *